G. SOLDANI.
TIRE SHIELD.
APPLICATION FILED OCT. 9, 1918.

1,373,984.

Patented Apr. 5, 1921.

Inventor
Girolamo Soldani,

By
Attorney

UNITED STATES PATENT OFFICE.

GIROLAMO SOLDANI, OF SPENCER, MASSACHUSETTS.

TIRE-SHIELD.

1,373,984. Specification of Letters Patent. Patented Apr. 5, 1921.

Application filed October 9, 1918. Serial No. 257,446.

*To all whom it may concern:*

Be it known that I, GIROLAMO SOLDANI, a citizen of the United States of America, residing at Spencer, in the county of Worcester and State of Massachusetts, have invented new and useful Improvements in Tire-Shields, of which the following is a specification.

The object of the invention is to provide a shield serviceable for pneumatic tires, so that the latter may be protected from punctures and other wear. To this end the shield comprises a metallic band substantially semicircular in cross section and surrounding this band there is a supplemental rim on which there is carried a relatively small cushion tire by means of which the band itself is kept out of contact with the ground. At one side of this tire engaging rim, the band is formed with a plurality of hingedly mounted members constituting its one side and these hingedly mounted members provide for the easy attachment of the band to the pneumatic tire. The hingedly mounted members are spring actuated and when the band is attached they serve to keep it from rattling on the tire, but to insure its being securely held in place, there are provided straps which connect each of the hingedly mounted members, pass over the felly and engage that side of the band opposite the hingedly mounted members.

The purpose of the invention is to provide a device of the above mentioned character which is simple in construction, durable and effective in operation and inexpensive to manufacture.

To the specific embodiment in which it is shown and described, the invention is not to be restricted. The right is reserved to make such changes or alterations as actual reduction to practice may suggest, in so far as such changes or alterations are compatible in spirit with the annexed claim.

Figures 1, 2, 3:
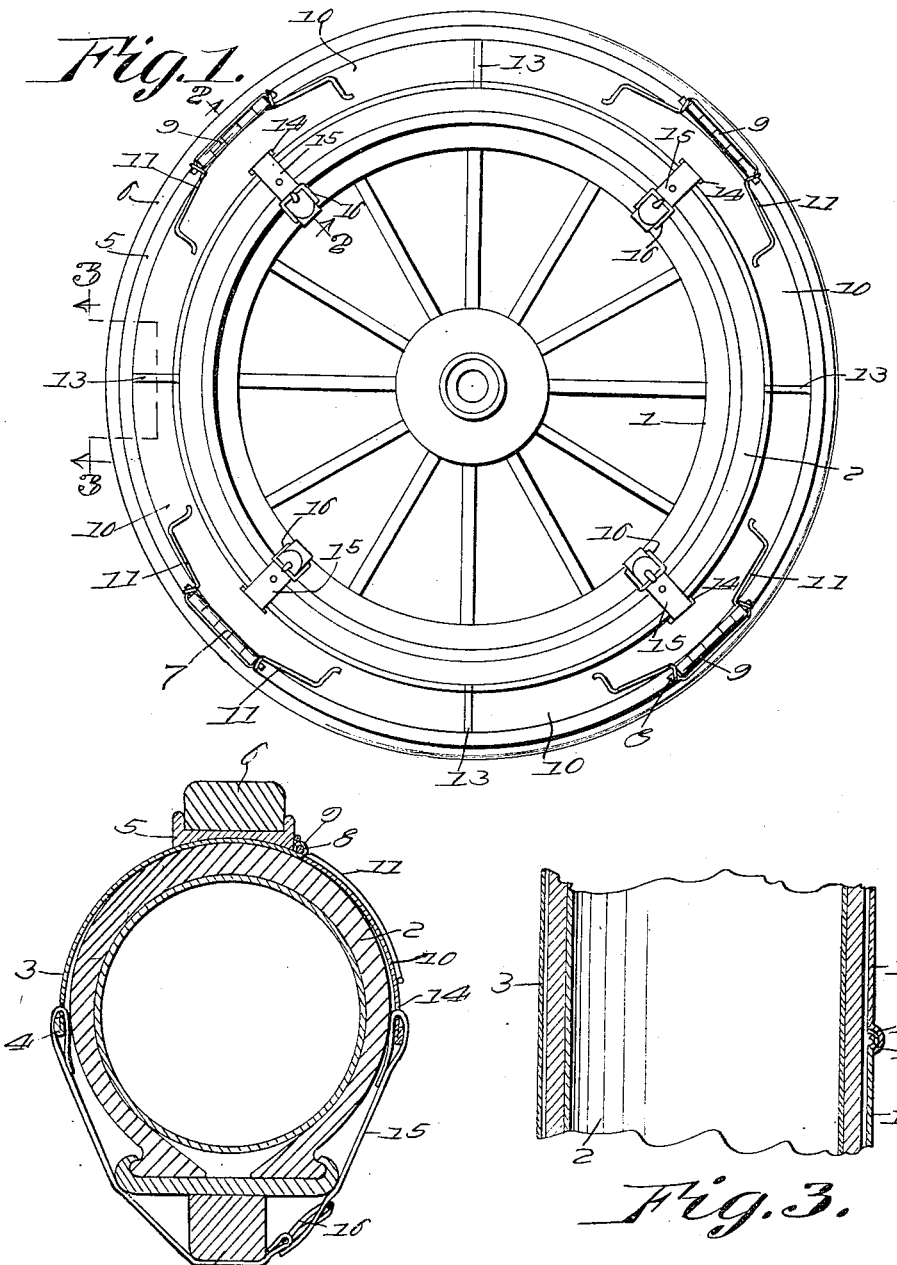
Figure 1 is a view in side elevation showing a wheel and its pneumatic tire to which there is attached the improved shield.
Fig. 2 is a section on the line 2—2 of Fig. 1.
Fig. 3 is a section on the line 3—3 of Fig. 1.

To illustrate the use of the invention there is shown a wheel 1 equipped with a pneumatic tire 2 of the usual style. The shield employed is designed to protect the tread and sides of this tire and to that end consists of a metallic band 3 arcuate in cross section so that it may extend from a specified line on one side of the tire to a line to one side of the transverse center of the tread. Where this band terminates at the side of the tire, it is provided with a marginal rib 4 formed preferably by bending back on itself the stock of which the band is made. To this band there is attached a tire engaging rim 5, the position of the latter, when the band 3 is mounted on the tire 2, being such that the small cushion tire 6 which is carried on the rim may serve as the tread of the whole structure.

The rim 5 stands adjacent to that edge of the band 3 which is remote from the marginal rib 4 and this edge of the band is provided with coiled portions 7 standing in definite spaced relation and arranged in pairs for the support of pintles 8 surrounding each of which there is a coiled portion 9 of a member 10. These members 10 of which there are preferably four constitute as much of the shield as is not comprised by the band 3 and they are all arcuate in shape and arcuate in cross section and, when the shield is attached to the tire 2, these members are held against the side of the tire by the springs 11 coiled around the pintles 8 with one portion bearing upon the rim 5 and the other portions bearing upon the side members 10.

The members 10 are designed to overlap each other at adjacent ends and these overlapping ends are formed with crimps or corrugations, the corrugation 12 of one member engaging over the corrugation 13 of the adjacent member, thus interlocking the two.

In attaching the device to a tire, it is so applied that the band 3 lies against the tread and one side of the tire, the hingedly mounted members 10 engaging the tire on the other side. It is obvious that these hingedly mounted members may swing back on the pintles 8 against the pressure of the springs 11 to permit the attachment of the device, and, when it is placed in position, the springs operate to cause the hingedly mounted members to engage the side of the tire snugly and thus tend to prevent any lateral movement of the shield as a whole on the tire.

In order to insure the shield remaining in attached position, the hingedly mounted members adjacent their free edges and the band 3 adjacent its free edges are provided with the eyes 14 positioned at specified points and through these eyes there are carried the straps 15 which embrace the felly of the wheel 1, the straps being secured together at their ends preferably by a buckle 16, although any other serviceable form of device for attaching the free ends of the straps may be employed.

From the foregoing description and the accompanying drawings it is believed that a clear enough understanding of the invention is to be had to render a further description unnecessary.

The invention having been described what is claimed as new and useful is:

A tire shield embodying a metallic band for attachment to a tire so as to embrace one side thereof and the tread, a plurality of members conforming in shape to the other side of the tire, the said members being hingedly attached to said band at the edge of that portion embracing the tread and having interlocking ends and springs bearing upon said members to force them in contact with the said other side of the tire, whereby the said members may be thrown back to permit the attachment of the band to a tire, the springs operating to throw the members into contact with the tire and thereby retain the whole device on the tire, as herein shown and specified.

In testimony whereof I affix my signature.

GIROLAMO SOLDANI.